US012742040B2

(12) United States Patent
Ashibe

(10) Patent No.: US 12,742,040 B2
(45) Date of Patent: Sep. 22, 2026

(54) RESIN MIXTURE, METHOD OF PRODUCING RESIN MIXTURE, STRETCH BLOW MOLDED PRODUCT, AND METHOD OF PRODUCING STRETCH BLOW MOLDED PRODUCT

(71) Applicant: CANON KABUSHIKI KAISHA, Tokyo (JP)

(72) Inventor: Tsunenori Ashibe, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 724 days.

(21) Appl. No.: 18/190,000

(22) Filed: Mar. 24, 2023

(65) Prior Publication Data

US 2023/0312821 A1 Oct. 5, 2023

(30) Foreign Application Priority Data

Apr. 4, 2022 (JP) ................................ 2022-062341

(51) Int. Cl.

| | |
|---|---|
| ***C08G 63/91*** | (2006.01) |
| ***B29C 45/04*** | (2006.01) |
| ***B29C 45/72*** | (2006.01) |
| ***B29C 49/00*** | (2006.01) |
| ***B29C 49/02*** | (2006.01) |
| ***B29C 49/12*** | (2006.01) |
| ***B29K 67/00*** | (2006.01) |
| ***B29K 507/04*** | (2006.01) |
| ***B29L 31/00*** | (2006.01) |
| ***B65D 1/02*** | (2006.01) |
| ***C08G 63/183*** | (2006.01) |
| ***C08J 3/20*** | (2006.01) |
| ***C08K 3/04*** | (2006.01) |
| ***C08L 67/02*** | (2006.01) |
| ***C08L 79/08*** | (2006.01) |
| ***G03G 15/08*** | (2006.01) |

(52) U.S. Cl.

CPC ........ *C08G 63/916* (2013.01); *B29C 45/0441* (2013.01); *B29C 45/7207* (2013.01); *B29C 49/0005* (2013.01); *B65D 1/0207* (2013.01); *C08G 63/183* (2013.01); *C08J 3/201* (2013.01); *C08K 3/04* (2013.01); *C08L 67/02* (2013.01); *C08L 79/08* (2013.01); *G03G 15/08* (2013.01); *B29C 2049/023* (2013.01); *B29C 2049/024* (2013.01); *B29C 49/12* (2013.01); *B29C 2949/0715* (2022.05); *B29C 2949/22* (2022.05); *B29C 2949/24* (2022.05); *B29C 2949/26* (2022.05); *B29C 2949/28* (2022.05); *B29C 2949/3032* (2022.05); *B29K 2067/003* (2013.01); *B29K 2507/04* (2013.01); *B29L 2031/7158* (2013.01); *C08J 2367/02* (2013.01); *C08L 2205/025* (2013.01); *C08L 2205/03* (2013.01)

(58) Field of Classification Search

None

See application file for complete search history.

(56) References Cited

U.S. PATENT DOCUMENTS

| | | | | |
|---|---|---|---|---|
| 4,071,503 | A | 1/1978 | Thomas | |
| 6,054,242 | A | 4/2000 | Okutani | |
| 6,096,818 | A * | 8/2000 | Nakaura | C08K 3/04 524/495 |
| 2002/0177663 | A1 * | 11/2002 | Cahill | C08L 67/02 525/177 |
| 2014/0338734 | A1 | 11/2014 | Fukuda | |

FOREIGN PATENT DOCUMENTS

| | | | |
|---|---|---|---|
| JP | H1149872 | A | 2/1999 |
| JP | 2000169623 | A | 6/2000 |
| JP | 2001042626 | A | 2/2001 |
| JP | 2003103517 | A | 4/2003 |
| JP | 2006321908 | A * | 11/2006 |
| JP | 2013159681 | A | 8/2013 |
| JP | 2014198422 | A | 10/2014 |
| JP | 2020096454 | A | 6/2020 |

OTHER PUBLICATIONS

JP-2006321908A Espacenet Translation (Year: 2006).*

* cited by examiner

*Primary Examiner* — Marc S Zimmer
*Assistant Examiner* — Virginia L Stonehocker
(74) *Attorney, Agent, or Firm* — Canon U.S.A., Inc. IP Division

(57) ABSTRACT

A resin mixture contains a binder resin and carbon black dispersed in the binder resin. The binder resin contains a polyethylene terephthalate having an imide bond in its molecule and having a density of 1.3345 g/cm$^3$ or less.

13 Claims, 10 Drawing Sheets

RESIN MIXTURE, METHOD OF PRODUCING RESIN MIXTURE, STRETCH BLOW MOLDED PRODUCT, AND METHOD OF PRODUCING STRETCH BLOW MOLDED PRODUCT

BACKGROUND

Technical Field

The present disclosure relates to a resin mixture, a method of producing a resin mixture, a stretch blow molded product, and a method of producing a stretch blow molded product.

Description of the Related Art

In an electrophotographic image-forming apparatus, a toner bottle for supplying a toner (developer) or the like used for forming an electrophotographic image needs to have such strength that it does not break even when dropped. Thus, as the toner bottle, an injection stretch blow molded product of polyethylene terephthalate, hereinafter, also referred to as "PET", is used (Japanese Patent Laid-Open No. 2001-42626). Here, the toner bottle is sometimes colored with carbon black in order to protect a toner contained therein.

In recent years, recycling PET bottles for beverages as PET bottles has been widely practiced from the viewpoint of environmental protection. Here, chemical recycling and material recycling are known as methods for recycling PET, as described in paragraphs [0008] and [0009] of Japanese Patent Laid-Open No. 2014-198422.

As disclosed in Japanese Patent Laid-Open No. 2000-169623, chemical recycling requires a multi-step process, which requires decomposition facilities and polymerization facilities, resulting in high recycling costs. Moreover, the environmental load is also large. PET produced by material recycling can be deteriorated and can have a reduced molecular weight. One of the causes of the decrease in molecular weight is considered to be due to, for example, the absorption of moisture from the air by PET during the material recycling process and subsequent hydrolysis by heating. Molded articles produced from PET having a reduced molecular weight may have unstable strength. As a method to compensate for such disadvantages of the material recycling, there is a mechanical recycling method in which a step of adjusting the intrinsic viscosity by repolymerization is added, as described in paragraph [0010] of Japanese Patent Laid-Open No. 2014-198422. However, solid-phase polymerization, which is known as a method of re-polymerizing PET, requires a large amount of thermal energy and has high environmental load.

Some toner bottles contain carbon black as described above. Thus, carbon black is contained in the PET regenerated from the collected used toner bottles through mechanical recycling. When an attempt is made to produce a stretch blow molded bottle by injection blow molding with pellets of such PET, the preform sometimes bursts during the injection stretch blow molding step to fail to produce the stretch blow molded bottle. Even if stretch blow molded bottles can be produced, the resulting stretch blow molded bottles are sometimes inferior in strength.

SUMMARY

At least one aspect of the present disclosure is directed to providing a resin mixture that can be stably subjected to stretch blow molding and a method of producing the resin mixture. Further, at least one aspect of the present disclosure is directed to providing a high-quality stretch blow molded product and a method of producing the stretch blow molded product.

According to at least one aspect of the present disclosure, there is provided a resin mixture containing a binder resin and carbon black dispersed in the binder resin, in which the binder resin contains a polyethylene terephthalate having an imide bond in its molecule and having a density of 1.3345 $g/cm^3$ or less.

According to at least one aspect of the present disclosure, there is provided a stretch blow molded product containing the resin mixture.

According to at least one aspect of the present disclosure, there is provided a method of producing the resin mixture, including a step of melt-kneading polyethylene terephthalate containing carbon black together with a carbodiimide compound. Further, according to at least one aspect of the present disclosure, there is provided a method of producing a stretch blow molded product, including a step of subjecting a preform to stretch blow molding, the preform containing the resin mixture.

Further features of the present disclosure will become apparent from the following description of exemplary embodiments with reference to the attached drawings.

DESCRIPTION OF THE EMBODIMENTS

Figure 1:
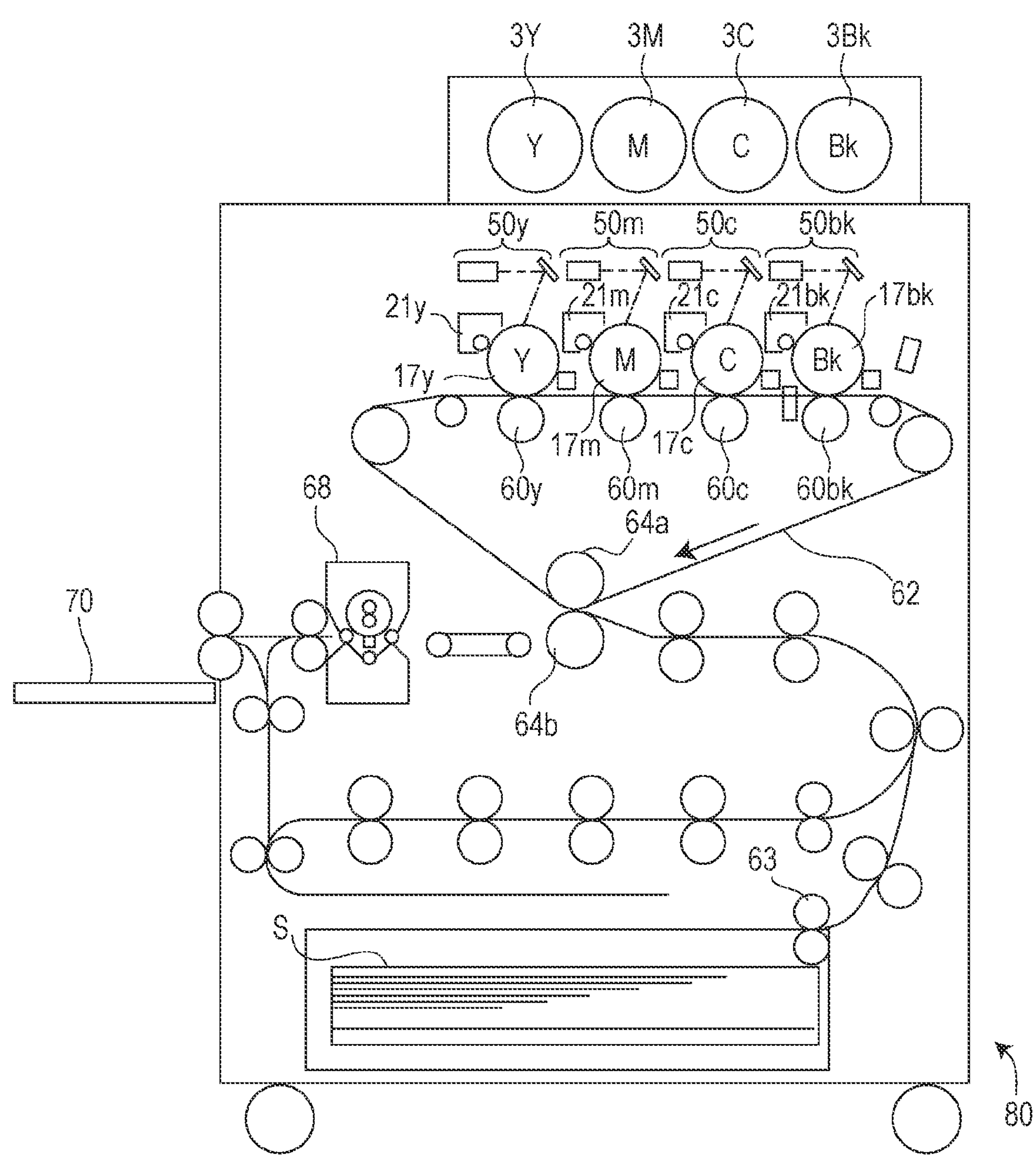
FIG. 1 is a schematic view of an image-forming apparatus according to an embodiment of the present disclosure.

In the present disclosure, unless otherwise specified, the expressions "XX or more and YY or less" and "XX to YY" refer to a numerical range that includes the lower limit and upper limit, which are end points. When numerical ranges are described in a stepwise manner, any combination of the upper limit and the lower limit of each numerical range is also disclosed.

Embodiments for carrying out the present disclosure will be exemplarily described in detail below with reference to the drawings. The scope of the present disclosure, however, is not limited to the following embodiments. In the following description, "%" refers to "% by mass" unless otherwise specified.

According to the studies by the inventors, PET as a result of the material recycling of the collected toner bottles, hereinafter, also referred to as "material recycle PET" or "MR-PET", has a reduced molecular weight as described above. In addition, carbon black, which can be crystal nuclei of PET, is contained. This is considered to be the cause of the fracture of the preform at the time of stretch blow molding and the formation of a bottle having poor strength. That is, the MR-PET having a reduced molecular weight very easily forms spherulites with carbon black as crystal nuclei. Thus, when a preform formed from MR-PET pellets containing carbon black is subjected to biaxial stretch blow molding, spherulites of the MR-PET rapidly grow using the carbon black as nuclei in the stretching step. This leads to a rapid increase in the hardness of a part of the preform, resulting in the formation of a portion that cannot follow stretching. Thereby, the preform is considered to fracture at the portion. Even if a bottle can be formed, stress is concentrated on a portion where the spherulite has grown in the bottle, and thus the bottle is considered to have lower strength. Meanwhile, increasing the molecular weight of MR-PET by solid-phase polymerization requires a large amount of energy as described above. The inventors have recognized the need to develop a resin mixture that can be stably subjected to stretch blow molding even when MR-PET containing carbon black is used. Based on this recognition, the inventors have conducted further studies and have found that polyethylene terephthalate having an imide bond in its molecule and having a density of 1.3345 g/cm$^3$ or less, which will be described below, can provide a resin mixture that contributes to stable formation of a stretch blow molded product.

Resin Mixture

The resin mixture according to at least one embodiment of the present disclosure satisfies the following two requirements a and b.

a: Carbon black is dispersed in a binder resin.

b: The binder resin contains a polyethylene terephthalate having an imide bond in its molecule and a density of 1.3345 g/cm$^3$ or less.

The resin mixture satisfying the above requirements a and b can inhibit the formation of spherulites during stretch blow molding to inhibit fracture during stretching and a decrease in strength of a molded product. As described above, the MR-PET sometimes has a lower molecular weight due to hydrolysis. Such MR-PET easily forms spherulites having carbon black as nuclei. The inventors have attempted to modify the MR-PET by reacting the MR-PET with a polycarbodiimide. It is already known that the hydrolysis resistance of PET is improved by reacting PET with polycarbodiimide, as described in Japanese Patent Laid-Open No. 2013-159681. However, the inventors have conducted studies and have found that the reaction of PET with a polycarbodiimide allows the resulting PET to have a density of 1.3345 g/cm$^3$ or less. An amorphous PET has a density of 1.3350 g/cm$^3$. The PET having a density of 1.3345 g/cm$^3$ or less is considered to have a bulky molecular structure. The molecular chains of the PET having the bulky molecular structure are not easily folded. This seemingly leads to a difficulty in the development of spherulites, even in the presence of carbon black. Accordingly, it is considered that the PET satisfying the requirement b is not easily fractured during the stretching step in stretch blow molding in the presence of carbon black and less likely to cause a decrease in the strength of the molded product. As described above, the density in the requirement b can be regarded as a parameter that represents the bulkiness of the molecular structure of the PET. The PET according to an embodiment of the present disclosure may have a density of 1.3320 g/cm$^3$ or less.

A PET according to the above requirement b, hereinafter, also referred to as a "modified PET", is prepared by reacting a PET having no carbodiimide in its molecule, hereinafter, also referred to as an "unmodified PET", with polycarbodiimide. The unmodified PET may be an MR-PET, or may be a virgin PET, in which the molecular weight is not decreased. However, when the MR-PET having a disadvantage that spherulites are easily formed is used as the unmodified PET, the effect according to an embodiment of the present disclosure is more remarkably provided. The MR-PET may be an MR-PET originating from toner bottles in which the toner is contained. The MR-PET originating from toner bottles may contain carbon black that may be contained in the toner. When such an MR-PET is subjected to stretch blow molding, spherulites having carbon black as nuclei can be formed, thereby making it difficult to produce a stretch blow molded product. However, an MR-PET modified by reaction with a polycarbodiimide so as to have a density of 1.3345 g/cm$^3$ or less as described above can be subjected to stretch blow molding even if the MR-PET contains carbon black.

The presence and quantity of the imide bonds in the modified PET can be determined by, for example, measurement using FT-IR.

PET

PET is prepared by a condensation reaction or transesterification reaction of terephthalic acid or its ester-forming derivative and 1,2-ethanediol or its ester-forming derivative. The PET may be a PET prepared by copolymerization or may be a homopolymer.

Polycarbodiimide

As described above, the modified PET according to an embodiment of the present disclosure is prepared by reacting a PET with a polycarbodiimide. The polycarbodiimide used for the modification has one or more carbodiimide groups represented by "—N═C═N—" in its molecule. For example, the polycarbodiimide can be produced by heating an organic isocyanate in the presence of a catalyst to cause a decarboxylation reaction. Examples of the organic isocyanate include aliphatic diisocyanates, alicyclic diisocyanates, and aromatic diisocyanates. Specific examples of the polycarbodiimide include aromatic polycarbodiimides, such as poly(4,4'-diphenylmethane carbodiimide), poly(p-phenylene carbodiimide), poly(m-phenylene carbodiimide), poly(diisopropylphenyl carbodiimide), and poly(triisopropylphenyl carbodiimide); and alicyclic polycarbodiimides, such as poly(dicyclohexylmethane carbodiimide). These polycarbodiimides may be used alone or in any combination of two or more. Among these polycarbodiimides, aliphatic polycarbodiimides may be used from the viewpoint of further reducing the density of the modified PET. Aliphatic polycarbodiimides are commercially available as, for example, "Carbodilite HMV-15CA", "Carbodilite LA-1" and "Carbodilite HMV-5CA-LC" (all of these are trade names, available from Nisshinbo Chemical Co., Ltd).

The amount of polycarbodiimide mixed with the unmodified PET can be in the range of 0.1% to 1.0% by mass based on the unmodified PET. When the amount mixed is within the above range, the density of the modified PET is easily adjusted to 1.3345 g/cm$^3$ or less. In addition, an increase in viscosity due to an excessively large molecular weight of the modified PET can be inhibited.

Polycarbodiimide is highly reactive with PET. Thus, the physical properties of the modified PET can be greatly affected by a slight change in the amount of polycarbodiimide mixed with the unmodified PET. Typically, polycarbodiimide is used in powder form. For this reason, even when polycarbodiimide is melt-kneaded with the pellets of the unmodified PET, a uniform reaction with the unmodified PET does not proceed easily. The modified PET can thus be prepared by diluting a polycarbodiimide with a small amount of unmodified PET in advance, melt-kneading the mixture at a temperature equal to or higher than the melting point of the PET to prepare masterbatch pellets, mixing the masterbatch pellets with pellets of the unmodified PET, and melt-kneading the pellet mixture. In the preparation of the masterbatch pellets, the polycarbodiimide content can be 10%, and the unmodified PET content can be 90%, that is, the polycarbodiimide can be diluted 10 times with the unmodified PET. In this case, the resulting masterbatch pellets contain the modified PET and the unreacted polycarbodiimide. Subsequently, the masterbatch pellets are mixed with pellets of the unmodified PET, and the pellet mixture is melt-kneaded at a temperature equal to or higher than the melting point of the PET, so that the polycarbodiimide and the unmodified PET can be more uniformly reacted with each other. Thereby, a more uniform modified PET can be prepared. An example of the method of reacting the polycarbodiimide with the unmodified PET is a method in which a mixture of the unmodified PET and the polycarbodiimide or the masterbatch pellets containing the polycarbodiimide is melt-kneaded under heating at a temperature equal to or higher than the melting point of the PET, specifically 250° C. or higher, particularly 260° C. or higher, with an extruder.

Carbon Black

Examples of the type of carbon black include, but are not limited to, furnace black, channel black, and acetylene black. When, for example, an MR-PET originating from toner bottles is used as the unmodified PET, carbon black used in toner bottles often contains carbon black having high coloring power, such as furnace black. Accordingly, when an MR-PET containing furnace black originating from toner bottles is used as the unmodified PET serving as a raw material of the modified PET according to an embodiment of the present disclosure, the resin mixture according to an embodiment of the present disclosure contains furnace black as carbon black.

The resin mixture according to an embodiment of the present disclosure can have a carbon black content of 0.10 parts or less by mass based on 100 parts by mass of the modified PET. When the resin mixture has a carbon black content of 0.10 parts or less by mass based on 100 parts by mass of the modified PET, it is possible to inhibit an increase in the hardness of the resin mixture due to carbon black. The lower limit of the carbon black content is not limited to a particular value, and is, for example, more than 0.00 parts by mass. That is, the carbon black content of the resin mixture according to an embodiment of the present disclosure is preferably more than 0.00 parts by mass and 0.100 parts or less by mass, particularly preferably more than 0.000 parts by mass and 0.001 parts or less by mass based on 100 parts by mass of the modified PET.

A method according to an embodiment for producing a stretch blow molded product (stretch blow molded bottle) by biaxial stretch blow molding with the resin mixture according to an embodiment of the present disclosure will be described below.

Figure 2:
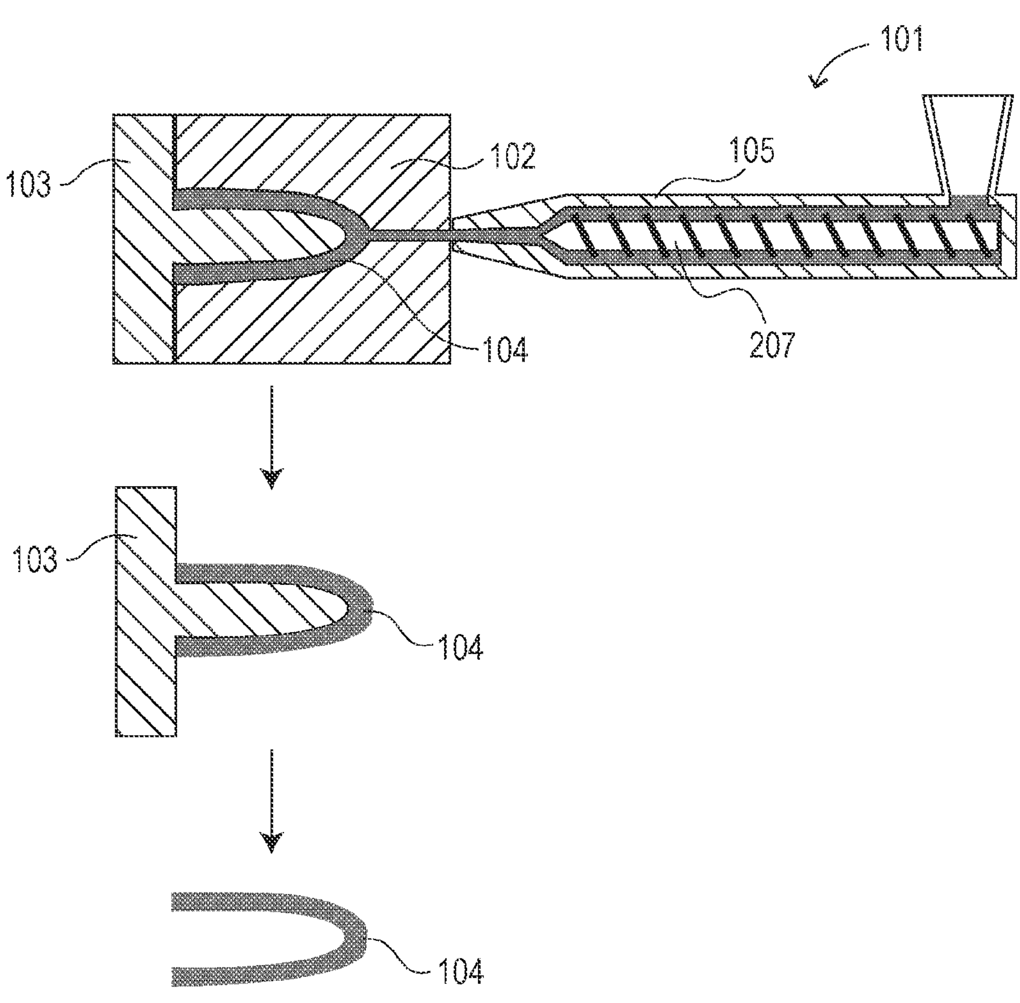
FIG. 2 is a schematic view illustrating a method of molding a preform according to an embodiment of the present disclosure.

As illustrated in FIG. 2, a preform 104 having a test-tube shape is formed by injection molding. Specifically, a material fed into an injection molding machine 101 is melted under heating in a heating cylinder 105. The melted material is injected into preform molds 102 and 103 with an extrusion screw 207 to form the preform 104.

Figure 3:
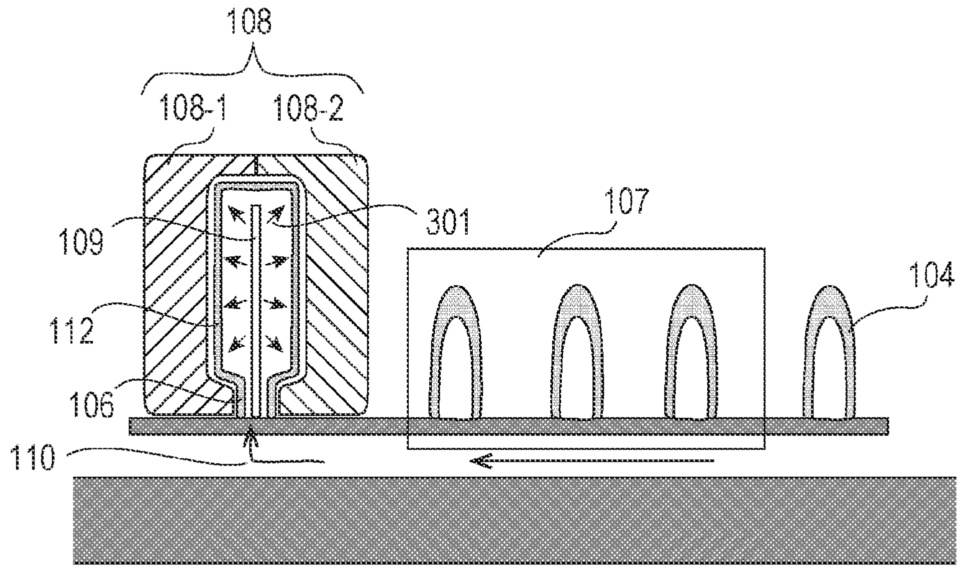
FIG. 3 is a schematic view illustrating a blow molding method according to an embodiment of the present disclosure.

As illustrated in FIG. 3, biaxial stretch blowing (biaxial stretch molding) is performed. The preform 104 is placed in a heating furnace 107 and heated to a temperature at which the preform can be stretched. The heating time at this time can be within three minutes. When the heating time is within three minutes, it is possible to inhibit the progress of the crystallization of the crystalline polyester in the preform during the heating. After the heating, the heated preform 104 is taken out from the heating furnace 107 and placed at a mouth portion of a blow mold 108 including a cavity formed by combining a left-hand mold section 108-1 and a right-hand mold section 108-2.

The preform can be placed in the mouth portion of the blow mold in a short time (for example, within 10 seconds) in such a manner that the temperature of the heated preform does not decrease before the start of the biaxial stretching step. This makes it possible to inhibit progress of crystallization of the crystalline polyester in the preform due to slow cooling of the preform.

The heated preform placed in the blow mold 108 is stretched in the longitudinal direction with a stretch rod 109. This stretching is referred to as "primary stretching". At this time, a gas can be introduced in such a manner that the preform 104 does not come into contact with the stretch rod 109. The pressure of the gas at this time is referred to as a "primary blow pressure".

After the primary stretching, a gas 110 is allowed to flow through the mouth portion 106 of the preform to expand the preform in the transverse direction (circumferential direction). This is referred to as "secondary stretching". The pressure of the gas at this time is referred to as a "secondary blow pressure". Examples of the gas blown include air, nitrogen, carbon dioxide, and argon. By performing the primary stretching and the secondary stretching, the preform 104 expands in directions indicated by arrows 301, is brought into close contact with the inner wall of the blow mold 108, and is cooled and solidified in this state. The left-hand mold section 108-1 and the right-hand mold section 108-2 of the blow mold 108 are separated from each other, and a blow molded product 112 is taken out from the blow mold 108. The blow molded product 112 is stretched in both the longitudinal and transverse directions and thus has high strength.

As described above, in the stretching step of the injection stretch blow molding, it is important that the preform be in a non-crystallized state (amorphous state). When the preform is in an amorphous state and has reached the blow molding temperature, the preform can be subjected to blow molding, i.e., biaxial stretch molding, as it is, so that the PET is stretched and crystallized in the stretching direction to form a stretch blow molded bottle having high strength.

Examples of an injection stretch blow molding process include a one-step process and a two-step process. The one-step process is a process in which residual heat of the preform immediately after the preform is taken out from the mold is used to perform stretch blow molding as it is or after the temperature is adjusted. The two-step process is a process in which after the preform is temporarily cooled to room temperature, the temperature of the preform is adjusted, and the preform is subjected to stretch blow molding.

Figure 9:
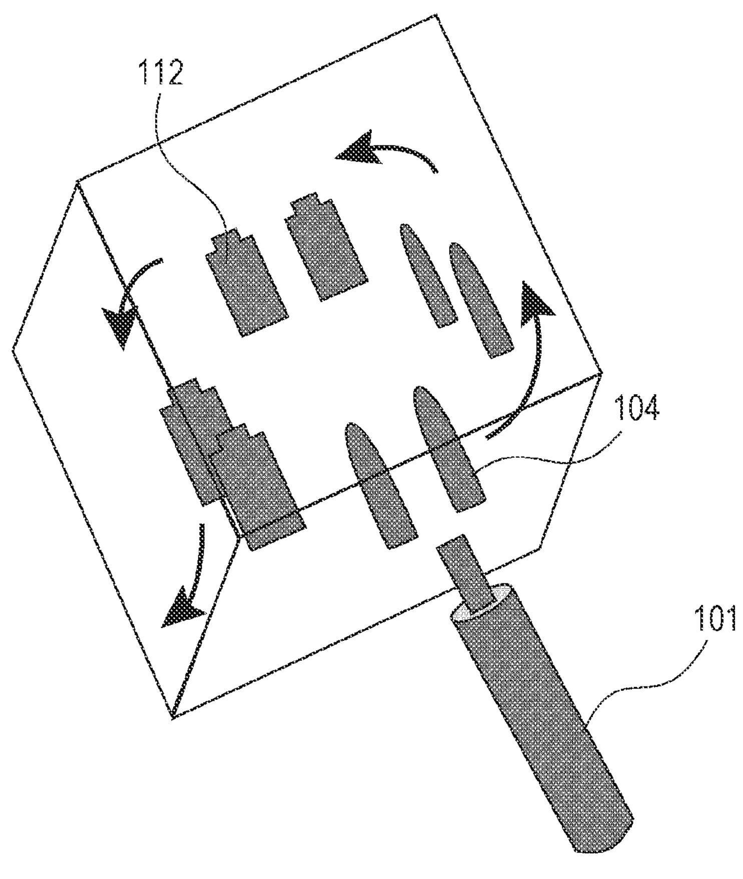
FIG. 9 is a schematic view of a one-step blow molding process according to an embodiment of the present disclosure.

In the one-step process, as illustrated in FIG. 9, after the preform 104 is injection-molded from the injection molding machine 101, cooling is completed in a short time of 10 seconds or less in the injection molding in such a manner that the temperature of the preform 104 does not fall below the glass transition temperature of the PET. Immediately after that, the preform is heated to a blow molding temperature (for example, 90° C. to 120° C.) and subjected to blow molding to produce a stretch blow molded bottle 112. In this case, an apparatus in which the injection molding machine and a blow molding machine are integrated is used.

The two-step process is a process as follows: After the preform is injection-molded, the preform is cooled to a temperature equal to or lower than the glass transition temperature of the PET and taken out. The resulting preform is heated to a blow molding temperature (for example, 90° C. to 120° C.) and subjected to blow molding with a blow molding machine. In this case, an apparatus including separate injection and blow molding machines are used.

Unlike the two-step process, in the one-step process, the preform is not cooled to a temperature equal to or lower than the glass transition temperature, so that reheating energy can be reduced. However, in a carbon black-containing PET, when the PET is held at the crystallization temperature of the PET for a longer time after injection molding, the isothermal crystallization of the PET proceeds more easily than a carbon black-free PET. The crystallization temperature of PET is in the range of about 200° C. to about 130° C.

Therefore, the resin mixture of an embodiment of the present disclosure has the effect that isothermal crystallization is less likely to proceed in both of the one-step process and the two-step process. In particular, the effect is significant in the one-step process.

It is difficult to identify how the properties of a biaxial stretch blow molded product change in biaxial stretching. However, in uniaxial stretching, it is possible to identify how the properties of a uniaxial stretch blow molded product change.

Figure 4:
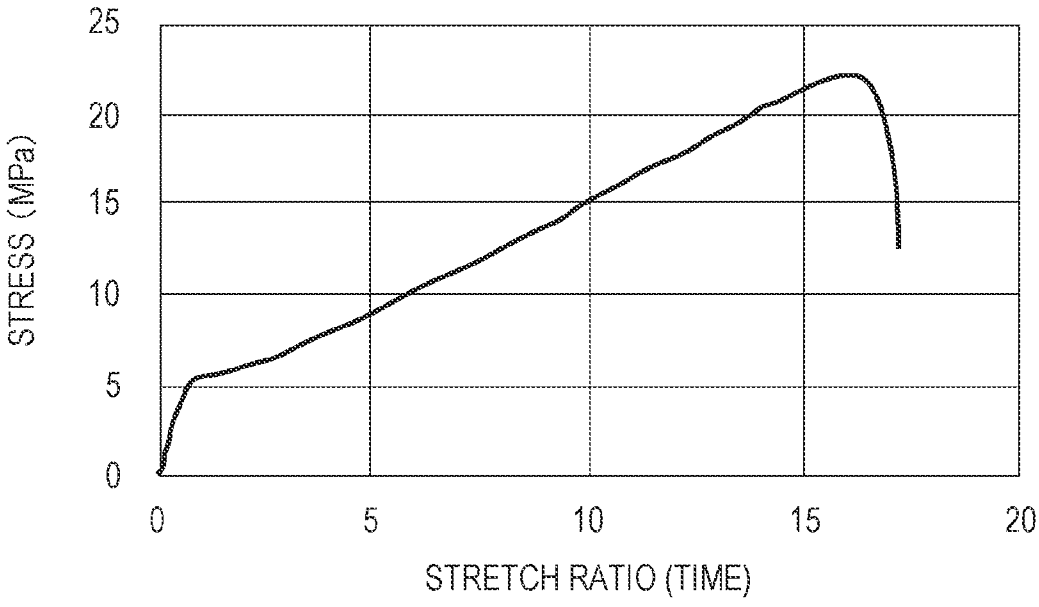
FIG. 4 is a stress-strain curve (S-S curve) of a uniaxially stretched polyethylene terephthalate according to an embodiment of the present disclosure.

FIG. 4 illustrates changes in the properties of PET due to uniaxial stretching.

A method of measuring the properties of PET by uniaxial stretching will be described.

Figure 5:
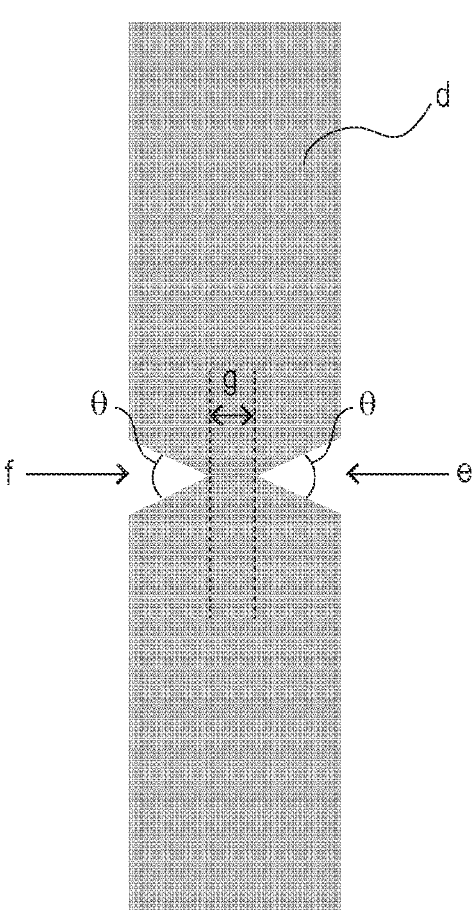
FIG. 5 illustrates a sample shape to be uniaxially stretched according to an embodiment of the present disclosure.

A PET is molded into a sample shape (Charpy specimen d in FIG. 5) in accordance with Japanese Industrial Standard (JIS) K7111-1: 2012 using an injection molding machine to prepare a non-stretched molded product. As illustrated in FIG. 5, the central part of the Charpy specimen is cut in both directions (e direction and f direction) with a notching machine (not illustrated) to form notches (cuts). The cutting is performed until the length g between the deepest portion of the notch formed in the e direction and the deepest portion of the notch formed in the f direction is 2.00 mm. The notch angle θ is 45°.

The cut Charpy specimen (test specimen) is heated to a blow temperature (100° C. in the present disclosure) with a heat gun. At this time, portions that are not stretched, in other words, portions between a portion notched with the notching machine and portions gripped by a tensile tester, are protected with, for example, heat-insulating sponges, in order not to increase the temperature. The time to reach 100° C. with the heat gun can be 90 seconds or less.

When the temperature of the portion to be stretched reaches 100° C., a tensile test is performed at a rate of 500 mm/min with a tensile tester (trade name: INSTRON 5582, available from INSTRON) in accordance with JIS K7161-1: 2014, and a stress-strain (elongation) curve, that is, an S-S curve, is output. The resin mixture according to an embodiment of the present disclosure can have a stress of 2.0 MPa or more and 15.0 MPa or less at a stretch ratio of 5 as read from the S-S curve. When the stress at the time of five-fold stretching is within the above range, the preform can be more easily subjected to biaxial stretch blow molding. Thereby, it is possible to more easily produce a toner bottle in which stretching crystallization has proceeded uniformly and which is excellent in strength. The stress can be 2.9 MPa or more and 10.2 MPa or less.

Figure 6:
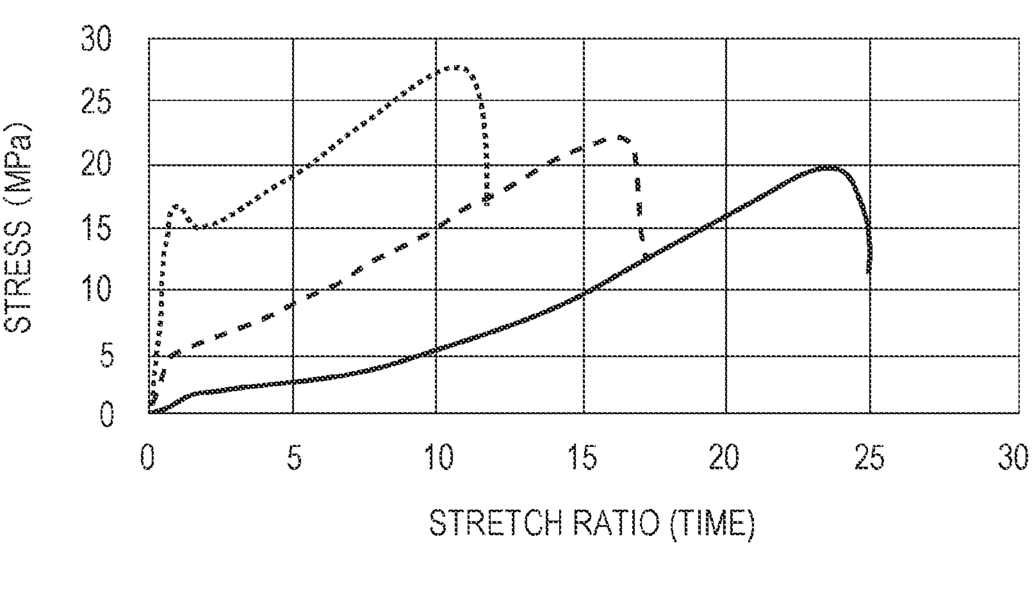
FIG. 6 illustrates S-S curves of three samples uniaxially stretched.

As a specific example, S-S curves of samples a to c composed of PETs described below are illustrated in FIG. 6.

Sample a

- A sample composed of 100% PET (trade name: TN-8550FF, available from Teijin Ltd., intrinsic viscosity (IV) value=0.77 dL/g) in an amorphous state.

Sample b

- PET (trade name: TN-8550FF, available from Teijin Ltd.): 98.6%
- A masterbatch containing the PET and having a carbon black content of 5% by mass: 1.4%
- A sample, having a crystallinity of 4%, prepared by injecting pellets, produced by melt-kneading the PET and the masterbatch, into an injection mold at a mold temperature of 25° C.

Sample c

- PET (trade name: TN-8550FF, available from Teijin Ltd.): 98.6%
- A masterbatch containing the PET and having a carbon black content of 5% by mass: 1.4%
- A sample, having a crystallinity of 18%, prepared by injecting pellets, produced by melt-kneading the PET and the masterbatch, into an injection mold at a mold temperature of 60° C.

As illustrated in FIG. 6, in the sample a in the amorphous state, the stress when the stretch ratio reaches five times from the start of stretching is as low as 2.6 MPa. The stretch ratio at which the specimen breaks is as high as 20 or more times. These results indicate that, when longitudinal stretching is performed with a stretch rod in stretch blow molding, the stress is such that the sample can be easily stretched with the stretch rod, and the sample can be inflated without bursting even in blow molding.

In sample b, the stress when the stretch ratio reaches five times after the start of stretching is 9.7 MPa, which is slightly higher than that in the amorphous state. The stretch ratio at which the specimen breaks is 16 times, which is lower than that of sample a. The reason for this is that in the sample b, spherulites of the PET containing carbon black as nuclei are formed to increase the hardness, and thus a larger force is required to stretch sample b.

Figure 7:
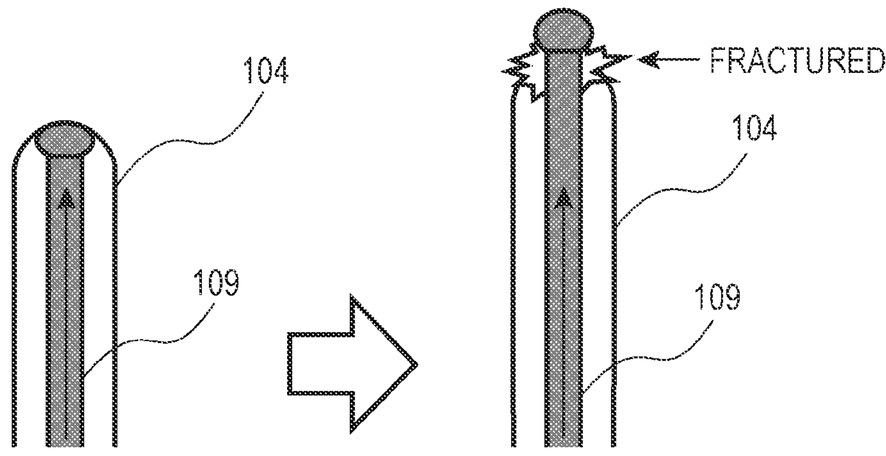
FIG. 7 is a schematic view illustrating a blow molded bottle in a cracked state.
Figure 8:
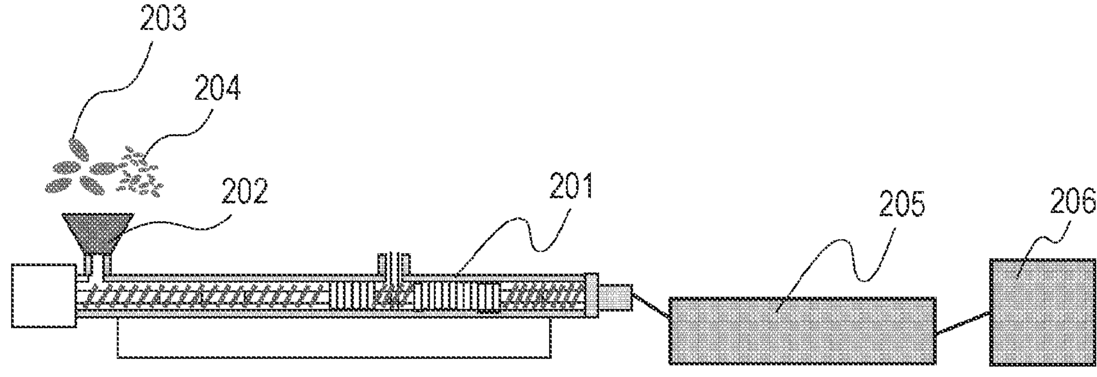
FIG. 8 is a schematic view of a twin-screw extruder according to an embodiment of the present disclosure.

Sample c is hard even at a temperature of 100° C. The stress when the stretch ratio reaches five times after the start of stretching is 19.6 MPa. When the stretch ratio slightly exceeds 10 times, the stress drops significantly. For this reason, as illustrated in FIG. 7, in the case where the preform prepared from the pellets of sample c was heated to a temperature of 100° C. and where an attempt was made to subject the preform to stretch blow molding, biaxial stretch blow molding of the preform was not able to be performed.

As described above, there is a strong correlation between the crystalline state of PET and the stretch blow moldability; thus, the stress measurement at the time of the uniaxial stretching at a temperature of 100° C. is considered to be suitable for determining whether the biaxial stretch blow molding can be performed.

Image-Forming Apparatus

A first embodiment of the present disclosure will be described below with reference to the drawings. FIG. 1 is a schematic view illustrating the structure of a four-color electrophotographic image-forming apparatus, and reference numeral 80 denotes the main body of the image-forming apparatus. The image-forming apparatus 80 is configured as what is called an intermediate transfer tandem-type image forming apparatus in which four color image-forming devices are arranged on an intermediate transfer belt.

In the image-forming apparatus 80, image formation is performed as follows: In the image-forming apparatus 80, electrostatic latent images are formed on photoconductive drums 17 (17*y*, 17*m*, 17*c*, and 17*bk*) by exposure devices 50 (50*y*, 50*m*, 50*c*, and 50*bk*) based on print data.

In the image-forming apparatus 80, the formed electrostatic latent images are developed by developing devices 21 (21*y*, 21*m*, 21*c*, and 21*bk*) to form toner images.

In the image-forming apparatus 80, the toner images are transferred onto an intermediate transfer member 62 by primary transfer devices 60 (60*y*, 60*m*, 60*c*, and 60*bk*), and are transferred onto a sheet material S supplied from a sheet feeder 63 by secondary transfer devices 64 (64*a* and 64*b*). In the image-forming apparatus 80, the toner images transferred onto the sheet material S are fixed to the sheet material S by a fixing device 68, and then the sheet material S is discharged to an output tray 70.

In the image-forming apparatus 80, a toner image is formed by the developing devices 21, and detachable toner bottles 3 (3Y, 3M, 3C, and 3Bk) are used to supply toner to the developing devices 21. The toner bottles according to an embodiment of the present disclosure are toner bottles used in this manner.

According to at least one embodiment of the present disclosure, it is possible to obtain the resin mixture that can be stably subjected to stretch blow molding. In addition, according to at least one embodiment of the present disclosure, a high-quality stretch blow molded product can be produced. Moreover, according to at least one embodiment of the present disclosure, it is possible to provide a method of stably producing a high-quality stretch blow molded product.

EXAMPLES

The present disclosure will be described in detail below using examples and comparative examples. However, the present disclosure is not limited to these examples.

In examples and comparative examples, the following items were measured and evaluated.

In the following examples, "%" indicates "% by mass" unless otherwise specified.

Production of Toner Bottle

Figure 10:
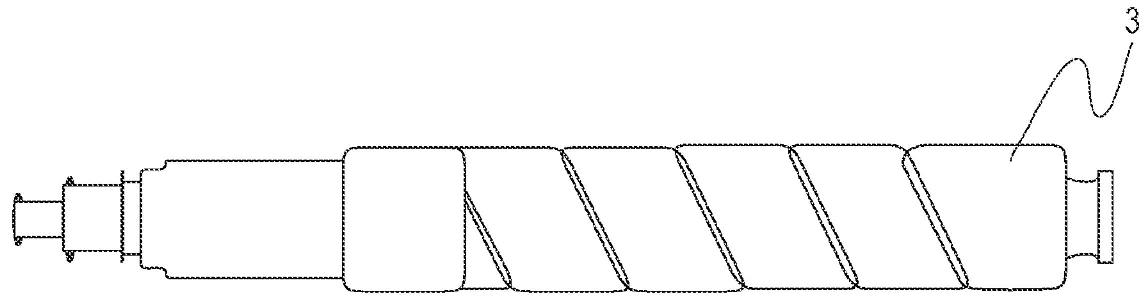
FIG. 10 is a schematic view of a blow molded bottle according to an embodiment of the present disclosure.

A toner bottle (total length: 439.5 mm, diameter: 101 mm) illustrated in FIG. 10 was produced with a one-step blow molding apparatus (trade name: ASB-70DPH, available from Nissei ASB Machine Co., Ltd). The blow stretch ratio was "longitudinal ratio×transverse ratio=6.7".

The "longitudinal ratio" of the blow stretch ratio is a value calculated by dividing the "total length after stretching" by the "total length (before stretching) of a portion (heated portion) of the preform reaching the stretching temperature".

The "transverse ratio" of the blow stretch ratio is a value calculated by dividing the "diameter of an intermediate portion after stretching" by the "diameter (before stretching) of the intermediate portion of the preform".

Materials given in Table 1 below were melt-kneaded and then pelletized, thereby resulting in a masterbatch having a carbon black concentration of 5%. The PET (trade name: TRN-8550FF) used here had a density of 1.3350 g/cm$^3$. For the measurement of the density, a dry-process automatic densitometer (trade name: AccuPyc 1340, available from Shimadzu Corporation) was used. Specifically, about 1 g of pellets of the PET were placed in an aluminum case for the dry-process densitometer and precisely weighed using an analytical balance (trade name: AB204-S, available from Mettler-Toledo International Inc). The aluminum case was mounted on the dry-process densitometer, and dry density measurement using helium gas was performed.

TABLE 1

| Material | Mixing proportion |
|---|---|
| Carbon black (trade name: MA-100, available from Mitsubishi Chemical Corp.) | 5% |
| PET (trade name: TRN-8550FF, available from Teijin Ltd.) | 95% |

The masterbatch having a carbon black concentration of 5% prepared as described above and the PET were mixed in the proportions given in Table 2 below. The mixture was melt-kneaded and then pelletized, thereby resulting in pellets of a resin mixture. The resulting pellets were dried at a temperature of 150° C. for 5 hours. In addition, a test specimen for the tensile test described above was prepared using the pellets. The tensile test was performed to create an S-S curve. The stress at a stretch ratio of five times was calculated and found to be 9.85 MPa.

TABLE 2

| Material | Mixing proportion |
|---|---|
| Masterbatch with carbon black concentration of 5% | 1.4% |
| PET (trade name: TRN-8550FF, available from Teijin Ltd.) | 98.6% |

Blow Molding Conditions

The resulting dry pellets of the resin mixture were fed into an extruder of a one-step stretch blow molding apparatus (trade name: ASB-70DPH, available from Nissei ASB Machine Co., Ltd.) and subjected to biaxial stretch blow molding to form a toner bottle. The one-step stretch blow molding apparatus can continuously perform a step of producing a preform having a test-tube shape by injection molding and a step of subjecting the preform to biaxial stretch blow molding to produce a molded product having a bottle shape. The screw diameter of the injection molding machine in the molding apparatus was 54 mm.

A mold capable of molding a test tube-shaped preform having an outside diameter of 30 mm, a wall thickness of 3.7 mm, and a length of 220 mm was provided as a mold for molding a preform. A preform was formed under the following molding conditions.

Screw diameter: 54 mm

Screw position before filling resin mixture into cavity: 95 mm

Injection speed
- Until the screw moves forward 5 mm: 50% of the maximum speed
- Until the screw moves forward another 20 mm: 30% of the maximum speed
- Until the screw moves forward another 35 mm: 25% of the maximum speed
- PV switching position: 35 mm Injection pressure
- Before PV switching: 12.0 MPa
- After PV switching: 4.5 MPa (dwell pressure)

Dwell time after PV switching
- 4.57 seconds

Heating cylinder temperature: 280° C.

Cooling time: 8.0 seconds

Mold temperature: 18° C.

After a cooling time of 8.0 seconds, the preform was removed from the mold and conveyed to the biaxial stretch blow station of the one-step stretch blow molding apparatus. The temperature of the preform during the conveyance was controlled as described below.

Preform heating temperature
- Position 10% of the total length of the preform from the top of the preform: 180° C.
- Position 25% of the total length of the preform from the top of the preform: 200° C.
- Position 50% of the total length of the preform from the top of the preform: 200° C.
- Position 75% of the total length of the preform from the top of the preform: 180° C.

The preform adjusted to the temperature described above was placed in a cylindrical mold that was adjusted to a temperature of 18° C. and that had a size corresponding to the size of a toner bottle. The preform was then subjected to biaxial stretch blow molding to produce a stretch blow molded bottle. The preform was heated during the conveyance, so that the surface temperature of the central portion of the preform was 100° C. immediately before the preform was placed in the cylindrical mold.

The stretch rod was inserted from the retracted position into the preform through the opening of the preform and moved forward until the stretch rod came into contact with the top of the preform. The air pressure driving stretch rod was set to 1.2 MPa, and stretch rod was further moved forward. Then, 0.5 seconds after the start of further forward movement of the stretch rod, primary air was introduced into the preform through the opening of the preform. The pressure of the primary air was 1.0 MPa. Secondary air was introduced 0.15 seconds after the introduction of the primary air. The pressure of the secondary air was 2.9 MPa. Air was introduced into the preform over 7.0 seconds from the start of the introduction of the primary air. The pressure in the preform was returned to normal pressure over a period of 2.5 seconds. Thereby, a stretch blow molded bottle was formed.

Example 1

Production of Recycled Pellets

The toner bottles produced as described above were crushed into substantially square pieces having a size of about 5 to about 10 mm with a crusher, thereby providing a crushed product, hereinafter, also referred to as a "flake product". This crushed product was melt-kneaded with a twin-screw extruder (PC-46, available from Ikegai Corp.) at a temperature of 260° C., a screw rotation speed of 200 rpm, and a discharge rate of 100 kg/h, and then pelletized. The pellets were maintained at a temperature of 150° C. for 5 hours and thus were crystallized. The resulting pellets are also referred to as "pellets of MR-PET (a)". The IV value of the MR-PET (a) was 0.72 dL/g. The IV value was lower than the initial IV value (0.77 dL/g). This revealed that the molecular chain of the MR-PET was shortened by the above-described recycling operation (crushing, melt-kneading, and pelletization).

A method of measuring the IV value was described below.
- Compliant with JIS K7390: 2003
- Measuring apparatus: Constant-temperature bath for kinematic viscosity measurement TV-5S (Thomas Kagaku Co., Ltd.)
- Mixed solvent: phenol/1,1,2,2-tetrachloroethane=60/40 (mass ratio)
- Viscometer: Ubbelohde viscometer (No. 1C)
- Solution concentration: 0.4 g/dL
- Measurement temperature: (30±0.05)° C.
- Pre-drying: 120° C.×1 hour
- Procedure: (1) In a 100-mL Erlenmeyer flask, 0.2 g of a dry sample and 50 mL of the mixed solvent were placed. The sample was completely dissolved at 100° C. for 30 minutes under stirring.
  - (2) The solution was allowed to cool naturally to room temperature and poured into the viscometer.
  - (3) The solution was allowed to stand in a constant-temperature water bath at 30° C. for 20 minutes or longer before measurement.
  - (4) IV was calculated from the following formula.

$$IV = \frac{-1 + \sqrt{1 + 4 \times \kappa \times \eta_{sp}}}{2 \times \kappa \times C}$$

- IV: IV value (dL/g)
- $\eta$sp: Specific viscosity [(t1/t0)−1]
- t0: Time for the mixed solvent to flow down (seconds)
- t1: Time for the sample solution to flow down (seconds)
- $\kappa$: Intrinsic coefficient of PET (=0.3083)
- C: Concentration of the sample solution (g/dL)

Preparation of Resin Mixture

The materials given in Table 3 below were melt-kneaded at a temperature of 260° C. with a twin-screw extruder (trade name: PC-46, available from Ikegai Corp.) at the mixing proportions presented in Table 3, and then pelletized, thereby producing pellets of a masterbatch.

TABLE 3

| Material | Mixing proportion |
|---|---|
| Polycarbodiimide compound (trade name: Carbodilite HMV-15CA, available from Nisshinbo Chemical Co., Ltd.) | 10% |
| PET (trade name: TRN-8550FF, available from Teijin Ltd.) | 90% |

Preparation of Resin Mixture According to Embodiment of the Present Disclosure The materials given in Table 4 below were melt-kneaded at a temperature of 260° C. with a twin-screw extruder (trade name: PC-46, available from Ikegai Corp.) at the mixing proportions presented in Table 4, and then pelletized, thereby producing pellets of carbon black-containing resin mixture 1 according to an embodiment of the present disclosure. The powder of the resulting pellets was subjected to FT-IR analysis. The results revealed that the pellets were composed of a PET having imide bonds in its molecule. The density was measured in the same manner as above and found to be 1.3344 g/cm$^3$. Here, the pellets subjected to the density measurement contain carbon black. The carbon black content is very small; thus, the value of the density can be substantially regarded as the value of the modified PET. The density was lower than the density (1.3350 g/cm$^3$) of PET ("TRN-8550FF") used as a raw material. These results allow the inventors to speculate that the kneading of the polycarbodiimide compound and the PET at the high temperature leads to the bonding of the PET molecular chains to each other with imide bonds, resulting in the PET having a bulky molecular structure.

TABLE 4

| Material | Mixing proportion |
|---|---|
| Pellets of masterbatch | 3% |
| Pellets of MR-PET (a) | 97% |

Production of Stretch Blow Molded Bottle (Toner Bottle)

Biaxial stretch blow molding was performed with the above-described one-step stretch blow molding apparatus under the same blow molding conditions as described above, except that the resin mixture 1 was used. Thereby, a stretch blow molded bottle was able to be formed without bursting the preform in the middle of the molding. Visual observation of the resulting stretch blow molded bottle revealed no distortion due to the formation of spherulites of the PET.

Measurement of S-S Curve

The pellets of the resin mixture 1 were used to form a specimen to be subjected to the tensile test described above. The tensile test was performed to create an S-S curve. The stress at a stretch ratio of five times was calculated and found to be 10.16 MPa (15.00 MPa or less).

Examples 2 and 3

Pellets of resin mixture 2 and pellets of resin mixture 3 were produced in the same manner as in the resin mixture 1 of Example 1, except that the mixing proportions of the pellets of the masterbatch and the pellets of the MR-PET(a) given in Table 4 were changed as presented in Table 5. The density of each of the resulting pellets was calculated as in Example 1. Stretch blow molded bottles were produced as in Example 1, except that these pellets were used. The stretch blow molded bottles were able to be formed without bursting the preform in the middle of the molding. Visual observation of the resulting stretch blow molded bottles revealed no distortion due to the formation of spherulites of the PET.

The stresses at a stretch ratio of five times were calculated as in Example 1, except that the pellets of the resin mixture 2 and the pellets the resin mixture 3 were used.

Example 4

Pellets of MR-PET (b) were produced in the same manner as the pellets of the MR-PET (a), except that the screw rotation speed was changed to 300 rpm. The IV value of the MR-PET (b) was 0.69 dL/g. Since the screw rotation speed was higher than that of the MR-PET (a), the IV value of the PET is considered to have decreased due to the shear force of the screw.

Pellets of resin mixture 4 were produced as in Example 2, except that the MR-PET (a) was changed to the above-described MR-PET (b). The density of each of the resulting pellets was calculated as in Example 1. A stretch blow molded bottle was produced as in Example 1, except that these pellets were used. The stretch blow molded bottle was able to be formed without bursting the preform in the middle of the molding. Visual observation of the resulting stretch blow molded bottle revealed no distortion due to the formation of spherulites of the PET.

The stress at a stretch ratio of five times was calculated as in Example 1, except that the pellets of the resin mixture 4 were used.

Comparative Example 1

The density of the pellets of the MR-PET (a) was calculated as in Example 1.

An attempt was made to produce a stretch blow molded bottle as in Example 1, except that the pellets were used. However, the preform was fractured during stretching in one axial direction with the stretching rod, thereby failing to form a stretch blow molded bottle. The reason why the stretch blow molded bottle was not able to be formed is presumably that a small amount of carbon black contained in the MR-PET (a) acted as crystal nuclei during the stretch blow molding to develop spherulites of polyethylene terephthalate, thereby causing a rapid increase in the hardness of the preform and failing to stretch the preform.

The stress at a stretch ratio of five times was calculated as in Example 1, except that the MR-PET (a) was used.

TABLE 5

| | Mixing proportion | | |
|---|---|---|---|
| | MR-PET (a) (%) | MR-PET (b) (%) | Pellets of masterbatch (%) |
| Example 1 | 97 | 0 | 3 |
| Example 2 | 95 | 0 | 5 |
| Example 3 | 93 | 0 | 7 |
| Example 4 | 0 | 95 | 5 |
| Comparative example 1 | 100 | 0 | 0 |

Table 6 presents the results of Examples 1 to 4 and Comparative example 1.

TABLE 6

| | Density (g/cm$^3$) | Stress at a stretch ratio of five times (MPa) | Biaxial stretch blow molding availability |
|---|---|---|---|
| Example 1 | 1.3344 | 10.16 | yes |
| Example 2 | 1.3316 | 5.01 | yes |
| Example 3 | 1.3216 | 2.90 | yes |
| Example 4 | 1.3342 | 9.77 | yes |
| Comparative example 1 | 1.3571 | 19.26 | no (fractured) |

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2022-062341, filed Apr. 4, 2022, which is hereby incorporated by reference herein in its entirety.

What is claimed is:

1. A resin mixture, comprising:

a binder resin; and carbon black dispersed in the binder resin, the binder resin containing a polyethylene terephthalate having an imide bond in its molecule and having a density of 1.3345 g/cm$^3$ or less, wherein a stress when a test specimen is stretched five times at a temperature of 100° C. in accordance with Japanese Industrial Standard K7161-1:2014 is 2.0 MPa or more and 15.0 MPa or less, wherein the test specimen is prepared by making two notches in a central part of a non-stretched molded product at an angle of 45° from both directions, a length between deepest portions of the two notches being 2.00 mm, and wherein the non-stretched molded product is obtained by molding the resin mixture into a sample shape in accordance with Japanese Industrial Standard K7111-1:2012.

2. The resin mixture according to claim 1, wherein the density is 1.3320 g/cm$^3$ or less.

3. The resin mixture according to claim 1, wherein the stress is 2.9 MPa or more and 10.2 MPa or less.

4. The resin mixture according to claim 1, wherein an amount of the carbon black contained in the resin mixture is 0.10 parts or less by mass based on 100 parts by mass of the polyethylene terephthalate.

5. The resin mixture according to claim 1, wherein the polyethylene terephthalate having the imide bond in its molecule and having a density of 1.3345 g/cm$^3$ or less is a reaction product of an unmodified polyethylene terephthalate and a polycarbodiimide.

6. The resin mixture according to claim 5, wherein the unmodified polyethylene terephthalate is a recycled polyethylene terephthalate.

7. The resin mixture according to claim 6, wherein the recycled polyethylene terephthalate contains the carbon black.

8. A stretch blow molded product, comprising:

a resin mixture, the resin mixture containing:

a binder resin; and carbon black dispersed in the binder resin, the binder resin containing a polyethylene terephthalate having an imide bond in its molecule and having a density of 1.3345 g/cm$^3$ or less.

9. The stretch blow molded product according to claim 8, wherein the stretch blow molded product is a stretch blow molded bottle.

10. The stretch blow molded product according to claim 9, wherein the stretch blow molded bottle is a toner bottle.

11. A method of producing a stretch blow molded product, comprising:

a step of subjecting a preform to stretch blow molding, the preform containing a resin mixture, the resin mixture containing:

a binder resin, and carbon black dispersed in the binder resin, and the binder resin containing a polyethylene terephthalate having an imide bond in its molecule and having a density of 1.3345 g/cm$^3$ or less.

12. The method according to claim 11, wherein the stretch blow molded product is a stretch blow molded bottle.

13. The method according to claim 11, wherein the preform has a test-tube shape, and wherein the step includes:

a step of stretching the preform with a stretch rod in a longitudinal direction of the preform, and a step of allowing a gas to flow into the preform to stretch the preform in a circumferential direction of the preform.

* * * * *